United States Patent [19]

Maunz et al.

[11] Patent Number: 5,725,605
[45] Date of Patent: Mar. 10, 1998

[54] DISPERANT CONCENTRATE BASED ON DEGRADATION PRODUCTS OF POLYSACCHARIDES IN THE DYEING OF TEXTILES

[75] Inventors: Birgit Maunz, Erbach; Dieter Hietsch; Joerg Schad, both of Illertissen, all of Germany

[73] Assignee: Gruenau Illertissen GmbG, Illertissen, Germany

[21] Appl. No.: 619,678

[22] PCT Filed: Sep. 19, 1994

[86] PCT No.: PCT/EP94/03124

§ 371 Date: Mar. 28, 1996

§ 102(e) Date: Mar. 28, 1996

[87] PCT Pub. No.: WO95/09265

PCT Pub. Date: Apr. 6, 1995

[30] Foreign Application Priority Data

Sep. 28, 1993 [DE] Germany ............... 43 32 816.4

[51] Int. Cl.[6] ............ B01F 17/52; C09B 67/02; C09B 67/46
[52] U.S. Cl. .......... 8/553; 8/526; 8/561; 252/356; 252/357; 536/114
[58] Field of Search .............. 252/356, 357; 536/114; 8/495, 528, 553; 510/515, 516

[56] References Cited

U.S. PATENT DOCUMENTS

| | | | |
|---|---|---|---|
| 1,990,330 | 2/1935 | Kaplan | 536/114 X |
| 2,380,115 | 7/1945 | Leo et al. | 536/114 X |
| 3,007,879 | 11/1961 | Jordan | 252/357 X |
| 3,228,928 | 1/1966 | Opie et al. | 536/114 |
| 3,300,473 | 1/1967 | Christoffel et al. | 536/114 |
| 3,891,620 | 6/1975 | Cushman et al. | 536/114 X |
| 4,468,230 | 8/1984 | Thomas et al. | 8/528 |
| 4,960,876 | 10/1990 | Molteni et al. | 536/114 |

FOREIGN PATENT DOCUMENTS

| | | |
|---|---|---|
| 2679563 | 1/1993 | France . |
| 6019224 | 9/1985 | Japan . |

OTHER PUBLICATIONS

"The Merck Index, tenth edition" 1983, Merck & Co., Rahway, N. J., U.S.A. see p. 1161, paragraph 7944.

"Römpps Chemie–Lexikon, Achte, neubearbetete und erweiterte Auflage, Band 6, T–Z" 1988, Franchk'sche Verlagshandlung, Stuttgart, DE see p. 4449, paragraph Unronsäyren.

Ullmanns Encyklopädie der technischen Chemie, vol. A8, pp. 586–590.

"Zuckerchemie" Berlin 1966, p. 136 (1987).

*Primary Examiner*—Richard D. Lovering
*Attorney, Agent, or Firm*—Ernest G. Szoke; Wayne C. Jaeschke; Real J. Grandmaison

[57] ABSTRACT

A liquid dispersant concentrate stable against clouding at a temperature of 10° C. to 35° C. containing: (a) from 20% to 50% by weight of the degradation products of polysaccharides containing uronic acid units; and (b) the remainder, water, all weights being based on the weight of the concentrate.

16 Claims, No Drawings

DISPERANT CONCENTRATE BASED ON DEGRADATION PRODUCTS OF POLYSACCHARIDES IN THE DYEING OF TEXTILES

This application is a 371 of PCT/EP94/03124 filed Sep. 19, 1994.

BACKGROUND OF THE INVENTION

1. Field of the Invention

This invention relates to a liquid dispersant concentrate based on degradation products of polysaccharides containing uronic acid units which is stable against clouding at normal temperature.

2. Discussion of Related Art

Nowadays, dispersants are often used in the finishing of textiles, for example in pretreatment or in dyeing. Examples of such dispersants are lignin sulfonates, reaction products of lignin sulfonic acid with alkyl halides or alkyl sulfonic acid chlorides, protein fatty acid condensates, naphthalene sulfonic acid/formaldehyde condensates, alkylaryl sulfonates, polyvinyl alcohols, polyvinyl pyrrolidone, polyacrylates, glucose-containing polyacrylate copolymers, polyphosphates and derivatives thereof (cf. for example Ullmanns Encyklopädie der technischen Chemie, Volume A8, pages 586–590).

Unfortunately, the commercially available dispersants presently used by the expert for the finishing of textiles are attended by the disadvantage that they are either based on petrochemical raw materials and/or show poor biological degradability or eliminatability. In addition, many dispersants are powders which are more difficult to use in measured quantities by comparison with liquids.

DESCRIPTION OF THE INVENTION

The problem addressed by the present invention was to provide ecologically safe liquid dispersant concentrates based on native raw materials which would be suitable above all for use in the finishing of textiles. In particular, the dispersant concentrates according to the invention would avoid the above-described disadvantages of the prior art. A dispersant concentrate is understood to be a formulation which contains the dispersant in aqueous medium in a quantity of at least 20% by weight.

It has now surprisingly been found that the degradation products of polysaccharides containing uronic acid units effectively meet the requirements stated above in every respect.

Accordingly, the present invention relates to a liquid dispersant concentrate containing degradation products of polysaccharides and water which is stable against clouding at normal temperature, the degradation products being obtainable by thermal, hydrolytic, oxidative or enzymatic degradation of polysaccharides containing uronic acid units and the degradation products being present in a quantity of 20 to 50% by weight, based on the concentrate as a whole, and the viscosity of the dispersant concentrate—as measured at 20° C. with a Brookfield viscosimeter (spindle 1)—being in the range from 10 to 500 mPa.s.

Normal temperature in the context of the present invention is understood to be a temperature in the range from 10° to 35° C.

In the context of the invention, uronic acid units are understood on the one hand to be the uronic acids themselves, for example D-glucuronic acid or D-galacturonic acid, and on the other hand salts or esters thereof where a corresponding modification of the free carboxyl group of the uronic acids is present in the naturally occurring raw material. For example, it is known that the carboxyl group of glucuronic acid is usually present in the form of its Ca or Mg salt in vegetable gums and mucilages (cf. for example Henseke G., "Zuckerchemie" Berlin 1966, page 136). Examples of uronic acid units in which the carboxyl group is present in the form of its ester are pectin and tragacanth which contain inter alia D-galacturonic acid methyl esters as principal units.

Polysaccharides containing uronic acid units are naturally occurring products. They may be unconditionally used for the production of the degradation products to be employed in accordance with the invention. The type and quantity of uronic acid units present in the polysaccharides are basically not critical. For example, pectin which occurs in the cell walls and middle lamellae of higher terrestrial plants contains the uronic acid units D-galacturonic acid and D-galacturonic acid methyl ester as principal constituents. Algin which occurs in the cell walls of brown algae contains the uronic acid units D-mannuronic acid, L-guluronic acid and the corresponding acetyl derivatives as principal constituents.

Gum arabic (acacia gum) is mentioned as an example of a polysaccharide which does not consist solely or substantially of uronic acid units. This gum is the dried plant exudate which is obtained from the trunk or branches of various acacia species. The exudate also forms in the event of natural damage to the bark. For commercial production, cuts are made in the trees and the drops forming are collected after drying in air. Gum arabic is made up of the units L-arabinose, D-galactose, L-rhamnose and D-glucguonic acid in a ratio of about 3:3:1:1. However, this composition varies according to the acacia species, the time of year and the location.

Among the polysaccharides containing uronic acid units, those selected from the group consisting of pectin, algin, gum arabic, tragacanth, karaya gum, ghatti gum, shiraz gum and xanthan are particularly preferred.

In one particularly preferred embodiment, polysaccharides containing uronic acid units emanating from exudates of plants, including in particular gum arabic, tragacanth, karaya gum, ghatti gum and shiraz gum, are preferred.

It is specifically pointed out that cellulose and starch are not counted among the polysaccharides to be used for degradation in accordance with the invention because they do not contain any uronic acid units.

In the context of the invention, degradation products of polysaccharides containing uronic acid units are understood to be products which are obtainable by thermal, hydrolytic, oxidative or enzymatic degradation of the polysaccharides mentioned and which have a lower average molecular weight than the polysaccharides used for degradation and a higher average molecular weight than the monomer units—the products of complete degradation.

The polysaccharides used for degradation are of native origin. Accordingly, the molecular weights of the polysaccharides are subject to certain variations according to the particular regional and climatic conditions.

According to the invention, degradation of the polysaccharides is carried out in aqueous medium in such a way that a viscosity of 10 to 500 mPa.s, as measured at 20° C. with a Brookfield viscosimeter (spindle 1), is established for a solids content of 20 to 50% by weight. In other words, the viscosity of the polysaccharides functionally describes their degree of degradation.

The dispersing effect of the concentrates according to the invention is of the same order of magnitude as that of relevant commercial concentrates known to the expert from the prior art. In addition, the concentrates according to the invention have the further advantage that the degradation products of polysaccharides containing uronic acid units present in them are readily biodegradable and show very good eliminatability by comparison with comparable known dispersants for the finishing of textiles.

The concentrates according to the invention are preferably adjusted to a pH value in the range from 5.0 to 9.0 and, more particularly, to a pH value in the range from 6.5 to 7.5.

In one special embodiment of the present invention, the degradation of the polysaccharides containing uronic acid units is carried out in the presence of acids. The dispersant concentrates produced in this way have the additional advantage of improved stability in storage. This means that the dispersions are stable against clouding, i.e. do not show any signs of separation or creaming, even after storage for several months. It also means that there is hardly any change in consistency, i.e. the viscosity of the concentrates remains substantially constant in storage.

The type of acid used for the degradation of the polysaccharides is basically not critical. Examples of suitable acids are hydrohalic acids, such as HCl, sulfuric acid, phosphoric acid, polyphosphoric acid, amidosulfonic acids, lactic acid, glycolic acid, citric acid, tartaric acid. Acids particularly preferred for degradation are sulfuric acid, amidosulfonic acid and citric acid.

The degradation of shiraz gum with citric acid, particulars of which can be found in the Examples of the present application, is cited at this juncture as a representative example of the production of the dispersant concentrates according to the invention. However, the degradation of the polysaccharides suitable for the purposes of the invention is not confined to the particular conditions disclosed in the Examples. Thus, there are no particular limits to the reaction temperature and reaction time or to the type and quantity of reagent optionally used for degradation (acid, base, oxidizing agent, enzyme) in the degradation of the polysaccharide. In addition, degradation may be carried out continuously or discontinuously. Degradation is typically carried out by initially introducing the polysaccharide to be degraded in aqueous medium in a quantity of around 20 to 65% by weight and continuing the degradation process until the reaction mixture has reached the required viscosity. The reaction mixture is then filtered, optionally after adjustment to the required pH value, the filtrate obtained being the liquid dispersant concentrate according to the invention stable against clouding at normal temperature which contains the polysaccharide degradation products in a quantity of 20 to 50% by weight, based on the concentrate as a whole, and which has a viscosity in the critical range from 10 to 500 mPa.s, as measured at 20° C. with a Brookfield viscosimeter (spindle 1).

As already mentioned, the degradation products of polysaccharides containing uronic acid units should be present in the concentrates according to the invention in a quantity of 20 to 50% by weight, based on the concentrate as a whole, and the viscosity should be adjusted to a value of 10 to 500 mPa.s, as measured at 20° C. with a Brookfield viscosimeter (spindle 1). The following preferred ranges are mentioned in this connection:

for the content of degradation product in the concentrate: 30 to 40% by weight for the viscosity of the concentrate: 10 to 100 mPa.s.

In another embodiment of the present invention, the dispersant concentrates contain one or more other dispersing substances as additional constituents in addition to the degradation products of polysaccharides containing uronic acid units. The additional dispersing substances should be present in quantities of 0.1 to 10.0% by weight, based on the concentrate as a whole. Combinations of the above-described degradation products of polysaccharides containing uronic acid units with polyvinyl pyrrolidone have proved to be particularly effective.

The dispersant concentrates according to the invention may be used with advantage in the finishing of textiles.

Accordingly, the present invention also relates to the use of a liquid dispersant concentrate stable against clouding at normal temperature which contains degradation products of polysaccharides obtainable by thermal, hydrolytic, oxidative or enzymatic degradation of polysaccharides containing uronic acid units and also water, the degradation products being present in a quantity of 20 to 50% by weight, based on the concentrate as a whole, and the viscosity of the dispersant concentrate, as measured at 20° C. with a Brookfield viscosimeter (spindle 1), being in the range from 10 to 500 mPa.s in the finishing of textiles, more particularly for dispersing pigment soil in the pretreatment of textiles and for dispersing dyes in the dyeing of textiles.

The following Examples are intended to illustrate the invention without limiting it in any way.

EXAMPLES

1. General 1.1. Substances used

Dispersants

D-1: Commercial lignin sulfonate, solids content: 30% by weight

D-2: Commercially available powder-form naphthalene sulfonic acid/formaldehyde condensate D-3: Commercially available liquid, water-free glucose-containing polyacrylate copolymer.

b) Dyes

Indanthrene blue: "Indanthrenblau RS" (a product of BASF)

Palanil marine blue: "Palanilmarineblau BGF" (a product of BASF)

c) Other substances

Hydrosulfite: Sodium dithionite, $Na_2S_2O_4$ (a product of BASF)

1.2. Dilutions

In the testing of the dispersing effect, dilutions are mentioned in the following formulations. Thus:

a) The expression "1:10 solution" for the dispersant means that the commercially obtainable dispersant or the particular dispersant produced in accordance with Example 1 is further diluted with water in a ratio of 1:10 from the particular concentration present. The solution obtained was used in a quantity of 2.0 g/l for the formulation.

b) The expression "1:100 solution" for the dye means that the commercially obtainable solid dye is diluted with water in a ratio of 1:100. The dispersion obtained is used in a quantity of 0.1 g/l for the formulation.

2. Preparation and characterization of the dispersant concentrates

Example 1

5 kg of water were introduced into an autoclave and first 50 g of citric acid and then 3.7 kg of shiraz gum were added at room temperature. The mixture was heated to 135° C. under an excess pressure of 1.5 bar and treated for 150 minutes at that temperature. After cooling to room temperature, the mixture was neutralized with sodium hydroxide and, finally, was filtered through a pressure filter.

The following characteristic data were determined:

pH value (100 g product H$_2$O): 7.0

Dry matter content: 31.2% by weight

Viscosity: 22 mPa.s (20° C., Brookfield viscosimeter, spindle 1).

3. Testing of the dispersing effect 3.1. For the dye Indanthrenblau

Formulation: 2.0 g/l dispersant (1:10 solution)

0.1 g/l Indanthrenblau RS (1:100 solution)

10.0 ml/l sodium hydroxide 38° Be 2.0 g/l Hydrosulfite

Procedure 800 ml of water (8° dH) were introduced into a glass beaker and the formulation constituents mentioned above were added in the order indicated. The liquor was thoroughly mixed and heated to 55° C. on a hot plate. After a treatment time of 20 minutes, 2.0 ml/l of hydrogen peroxide (50%) were added. After another 5 minutes, 12 ml/l of acetic acid (60%) were added. The treatment was continued for another 5 minutes before the liquor was filtered under suction through a filter nutsche provided with a paper filter and connected to a water jet pump.

Evaluation

The appearance of the paper filter was evaluated by a trained test panel of three people with experience in the field of textile dispersants and corresponding performance evaluation. The evaluation was based on a scale of 1 (poor) to 6 (very good).

The extreme points of the scale may be described as follows:

If the filter is only light blue in color and if the holes of the filter nutsche beneath the filter shimmer through only weakly, a score of 6 is awarded. If the filter is coated with a color lake and the holes of the nutsche beneath the filter are clearly visible with a coarse structure, a score of 1 is awarded. Accordingly, a score of 6 indicates excellent dispersing power (little dye remaining on the filter) while a score of 1 expresses poor dispersing power (numerous dye particles remaining on the filter).

The following results were obtained according to the particular dispersant used:

| Dispersant | Evaluation |
|---|---|
| Degradation product of shiraz gum (according to Example 1) | 4 |
| D-1 | 3-4 |
| D-2 | 3-4 |
| D-3 | 1-2 |

3.2. For the dye Palanilmarineblau

Formulation: 2.0 g/l dispersant (1:10 solution)

0.1 g/l Palanilmarineblau RS (1:100 solution)

2.0 ml/l 60% acetic acid

Procedure

The formulation constituents mentioned above were introduced into 400 ml of water (8° dH) in the order indicated. The liquor as a whole was introduced into a stainless steel container suitable for a "Labomat" laboratory dyeing machine (Werner Mathis AG, Zurich). In the Labomat, the liquor was heated to 125° C. at a rate of 2° C./minute and was kept at that temperature for 1 hour. After cooling to 60° C., the liquor was filtered under suction through a filter nutsche as described under 3.1.

Evaluation

Evaluation was carried out as described in 3.1.

The following results were obtained according to the particular dispersant:

| Dispersant | Evaluation |
|---|---|
| Degradation product of shiraz gum (according to Example 1) | 5 |
| D-1 | 5 |
| D-2 | 5 |
| D-3 | 1-2 |

We claim:

1. A liquid dispersant concentrate stable against clouding at a temperature of from 10° C. to 35° C. comprising:
   (a) from 20% to 50% by weight of the degradation products of polysaccharides containing uronic acid units;
   (b) from 0.1% to 10% by weight of polyvinyl pyrrolidone; and
   (c) the remainder, water, all weights being based on the weight of the concentrate, said dispersant concentrate having a viscosity from 10 to 500 mPa.s as measured at 20° C. with a Brookfield viscosimeter spindle no. 1.

2. A concentrate as in claim 1 wherein said degradation products are derived from polysaccharides selected from the group consisting of pectin, algin, gum arabic, tragacanth, karaya gum, ghatti gum, shiraz gum and xanthan.

3. A concentrate as in claim 1 wherein said degradation products are derived from plant exudates selected from the group consisting of gum arabic, tragacanth, karaya gum, ghatti gum and shiraz gum.

4. A concentrate as in claim 1 having a pH value from 5.0 to 9.0.

5. A concentrate as in claim 1 wherein said degradation products are formed in the presence of an acid.

6. A concentrate as in claim 5 wherein said acid is selected from the group consisting of hydrohalic acid, sulfuric acid, phosphoric acid, amido-sulfonic acid, lactic acid, glycolic acid, citric acid, tartaric acid and mixtures thereof.

7. A concentrate as in claim 1 wherein said degradation products are obtained by thermal degradation, hydrolytic degradation, oxidative degradation, or enzymatic degradation.

8. The process of dispersing a textile finish composition comprising combining said textile finish composition with a liquid dispersant concentrate which is stable against clouding at a temperature of from 10° C. to 35° C., said concentrate comprising:
   (a) from 20% to 50% by weight of the degradation products of polysaccharides containing uronic acid units;
   (b) from 0.1% to 10% by weight of polyvinyl pyrrolidone; and
   (c) the remainder, water, all weights being based on the weight of said concentrate, said concentrate having a viscosity from 10 to 500 mPa.s as measured at 20° C. with a Broodeld viscosimeter spindle no. 1.

9. A process as in claim 8 wherein said degradation products are derived from polysaccharides selected from the group consisting of pectin, algin, gum arabic, tragacanth, karaya gum, ghatti gum, shiraz gum and xanthan.

10. A process as in claim 8 wherein said degradation products are derived from plant exudates selected from the group consisting of gum arabic, tragacanth, karaya gum, ghatti gum and shiraz gum.

11. A process as in claim 8 wherein said concentrate has a pH value from 5.0 to 9.0.

12. A process as in claim 8 wherein said degradation products are formed in the presence of an acid.

13. A process as in claim 12 wherein said acid is selected from the group consisting of hydrohalic acid, sulfuric acid, phosphoric acid, amido-sulfonic acid, lactic acid, glycolic acid, citric acid, tartaric acid and mixtures thereof.

14. A process as in claim 8 wherein said degradation products are obtained by thermal degradation, hydrolytic degradation, oxidative degradation, or enzymatic degradation.

15. A process as in claim 8 wherein said textile finish composition contains a dye.

16. A process as in claim 15 further including contacting a textile material with said textile finish composition.

* * * * *